March 25, 1969     D. D. HOWARD     3,435,453
SIDELOBE CANCELLING SYSTEM FOR ARRAY TYPE TARGET DETECTORS
Filed Nov. 6, 1967

INVENTOR
DEAN D. HOWARD

United States Patent Office 3,435,453
Patented Mar. 25, 1969

3,435,453
SIDELOBE CANCELLING SYSTEM FOR ARRAY TYPE TARGET DETECTORS
Dean D. Howard, Oxon Hill, Md., assignor to the United States of America as represented by the Secretary of the Navy
Filed Nov. 6, 1967, Ser. No. 680,685
Int. Cl. H04b 7/06
U.S. Cl. 343—100                    19 Claims

ABSTRACT OF THE DISCLOSURE

Sidelobe cancelling in electronically scanned arrays is obtained by using a small portion of the array aperture to form a broad auxiliary beam pattern which scans along with the main narrow beam pattern. The output from the auxiliary pattern is compared with the output from the main pattern so that signals originating in the sidelobe regions can be eliminated. The system may also be used with reflector arrays and feed-through arrays.

---

The invention described herein may be manufactured and used by or for the Government of the United States of America for governmental purposes without the payment of any royalties thereon or therefor.

Background of the invention

The present invention relates to an electronically scanned antenna array and more particularly to such an array with provisions for sidelobe cancelling.

It is known that the presence of sidelobes in receiving antenna patterns makes it possible for a single jammer to be effective against a radar from any angle of azimuth. Prior systems have met this problem by using an auxiliary broadbeam antenna whose gain in the region of the main antenna sidelobes slightly exceeds the gain of the main directional antenna sidelobes. Thus, any signal which gives a stronger signal in the auxiliary antenna than from the main antenna is known to be out of the region of interest and may be rejected. When the main antenna rotates the auxiliary antenna also rotates maintaining the proper relative pattern locations.

In an array antenna the main beam can move without physical antenna motion and an auxiliary antenna for sidelobe cancelling must move its broad beam to maintain the proper relative pattern locations. Prior art systems have used two separate antenna systems but this approach involves the complex problem of matching two complete systems almost perfectly in band pass, time delay and amplitude response.

Summary of the invention

In carrying out the present invention a small portion of the main array is used to obtain the desired auxiliary broad beam and this beam is moved along with the main beam by whatever scanning technique is used.

In a sub-array system, where the array is composed of many electronically steerable sub-arrays coupled with appropriately controlled relative phases, one or more of the sub-arrays may be coupled to an auxiliary receiver for sidelobe signal indication. By selection of the proper group of sub-arrays an appropriate broadbeam is obtained which will move with the main beam to provide the sidelobe cancelling monitor. In a reflector array or a feed-through array one or more secondary feed horns with a sufficiently narrow beam may be used so that it receives from only a portion of the array. The reflector array could use an off-set feed to avoid blockage. The auxiliary feed horn, to have the desired narrow beam for looking at only a small part of the array, must necessarily have a larger aperture than the main feed horn and blockage would be significant if it were not off-set.

An object of the present invention is the provision of a relatively simple solution to sidelobe cancelling in electronic arrays where a single fixed auxiliary antenna can not cover all regions where the main beam can be positioned.

Another object is to provide a much closer phase relation between main and auxiliary beam signals by using partially common apertures.

Still another object is to provide a sidelobe cancellation system which is not affected by the polarization of the received energy.

A further object of the invention is the provision of a sidelobe cancelling system which is applicable to electronically scanned array systems.

Still another object is to provide electronically scanned auxiliary and main beams for sidelobe cancelling.

Yet another object of the present invention is the provision of an electronically scanned reflector array or feed-through array with sidelobe cancelling.

A still further object of the present invention is use of a portion of the main array to act as an auxiliary array for providing sidelobe cancelling signal.

Another object of the present invention is to use a small portion of the main antenna array to provide a broad beam for use in sidelobe cancelling.

Description of the preferred embodiments

Figure 1:
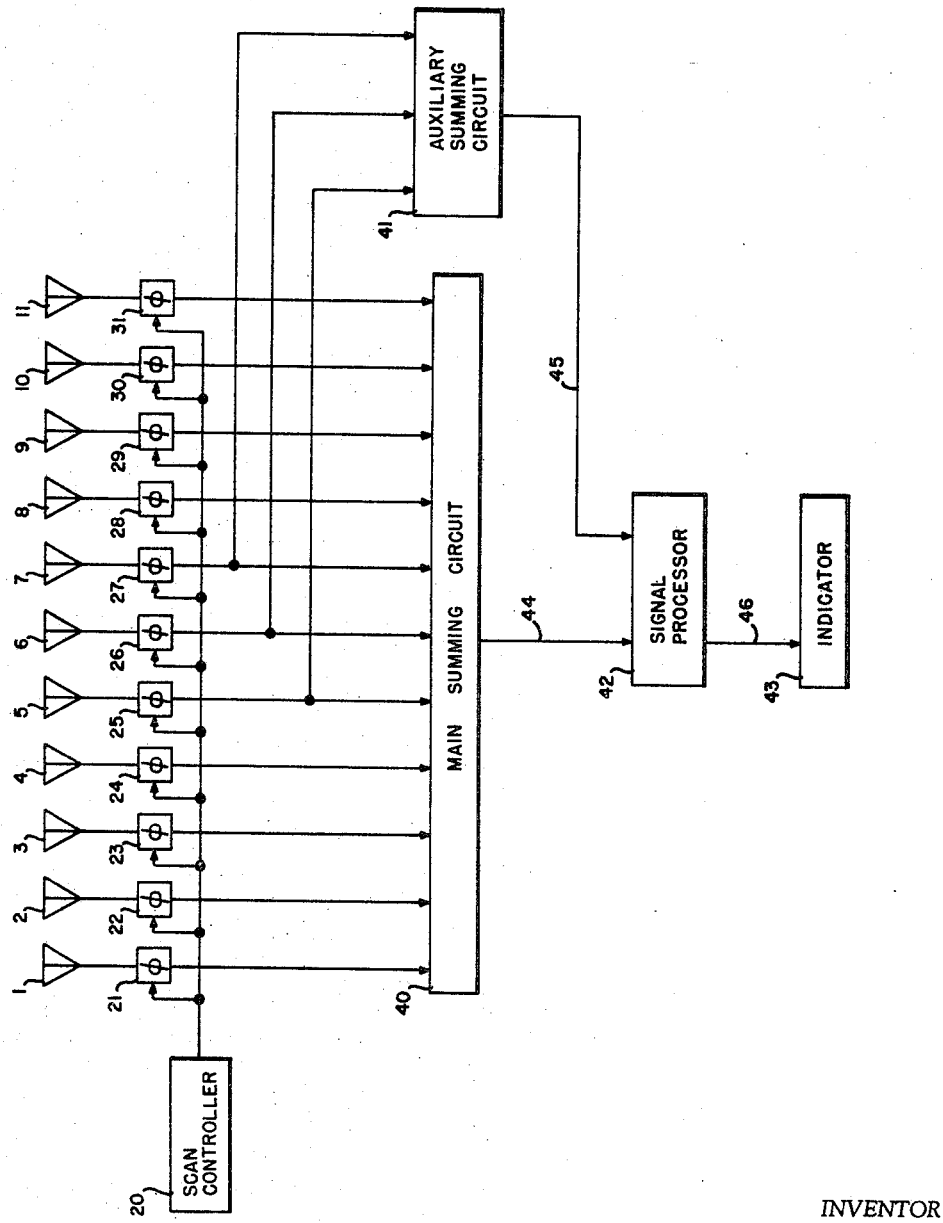
FIG. 1 shows a linear array embodying the present invention.

FIG. 1 shows a simple linear array embodying the present invention. Eleven elements 1–11 for radiating and picking up signals are shown arranged in a line although many more elements may be used and they may be arranged in one, two, or three dimensional configurations. The system of FIG. 1 is intentionally simple in order to clearly illustrate the invention. The pick-up elements 1–11 may be of any type suitable for electromagnetic, sonic, ultrasonic, infrasonic, etc. energy.

Blocks 21–31 represent variable phase shifters under the control of scan controller 20. Various phase shifters suitable for use with antenna arrays are well known. For specific examples of these devices see Microwave Scanning Antennas, Volume III Array Systems, by R. C. Hansen, Academic Press, 1966. Variable phase shifters are shown in FIG. 1 but fixed phased shifters could be used along with a variable frequency to obtain the desired beam scanning.

Signals from pick-up elements 1–11 are combined in main summing circuit 40 so that an output on line 44 would indicate the presence of a target detected by the main antenna pattern. Since this pattern contains undesired sidelobes, targets which are not within the primary lobe of the pattern will also cause outputs on line 44. In order to eliminate signals originating outside the primary lobe, a small number of the pick-up elements, e.g. elements 5, 6, and 7, are used to create an auxiliary reception pattern which is much broader than the primary lobe pattern of the total array. Since the beamwidth varies inversely with the size of the aperture, it can be seen that the reception pattern of elements 5, 6 and 7 will be broader than the main lobe of the pattern created by the total array. It can also be seen that as the direction of the narrow beam of the total aperture is shifted by varying phase shifters 21–31, the direction of the auxiliary beam of the subaperture is also shifted. The outputs from pick-up elements 5, 6, and 7 are combined in auxiliary summing circuit 41 and the resulting signal on line 45 may be subtracted in signal processor 42 from the signal on line 44. The gains of the various circuits can be chosen so that the output on line 44 from a signal originating in the sidelobe region of the main aperture pattern will be equal to the output on line 45 resulting from the same signal. When these two signals are supplied to processor 42 they will cancel each other and the signal on line 46 supplied to indicator 43 will be free from signals originating in the sidelobe region. On the other hand targets located in the primary lobe of the main array would cause a much higher signal on line 44 which would not be cancelled by the smaller signal on line 45. In this way the directivity of the total system is greatly enhanced. Indicator 43 will indicate targets in the main beam of the total aperture while signals originating outside this beam will be omitted.

Various types of signal processors could be used. For example, U.S. Patent No. 3,202,990 issued Aug. 24, 1965 to Paul W. Howells discloses a system which could accomplish the desired result.

Figure 2:
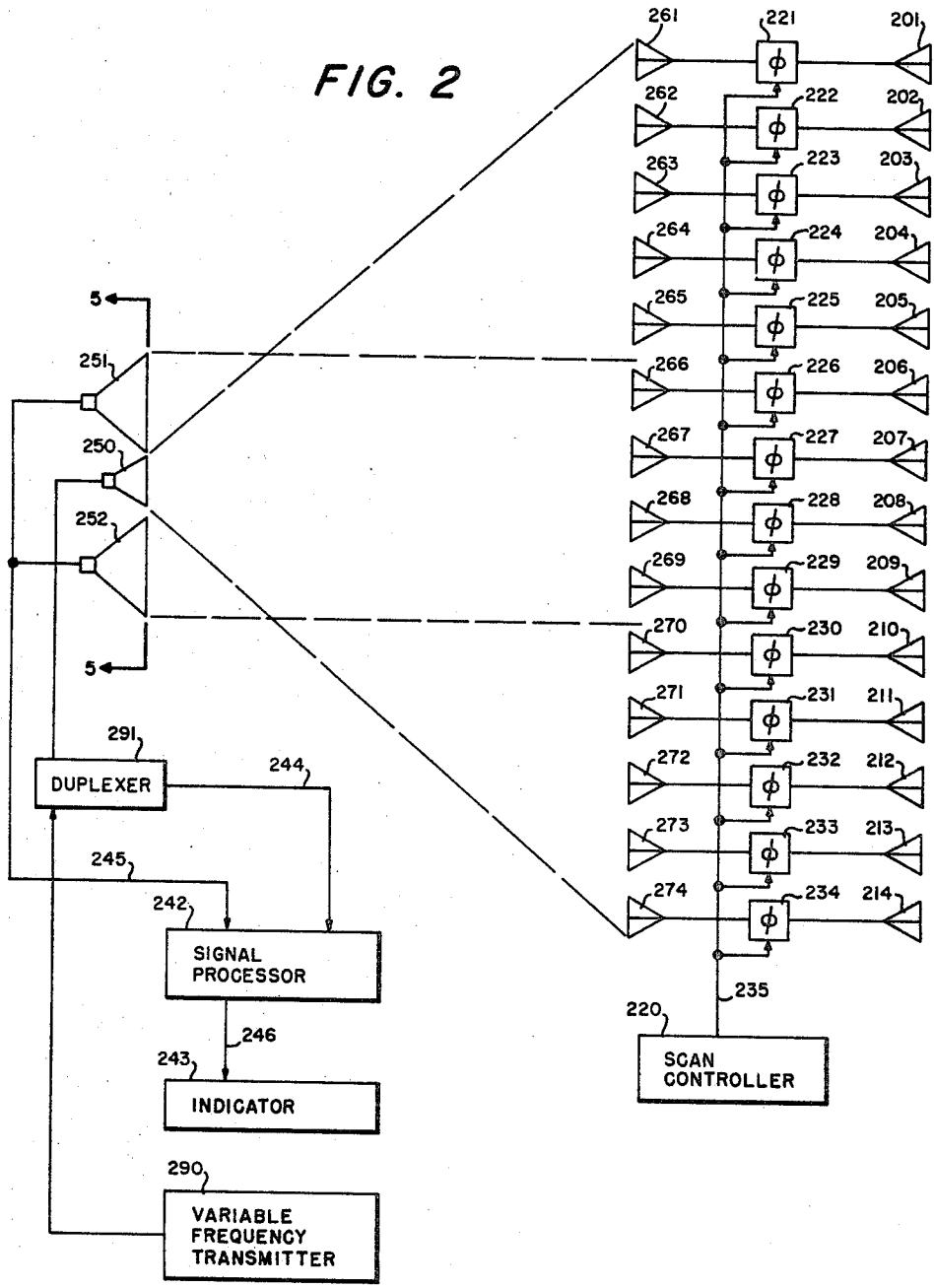
FIG. 2 shows a feed-through array according to the present invention.

FIG. 2 shows another embodiment of the invention where pick-up elements 201–214 are connected through a rack of phase shifters 221–234 to radiating elements 261–274. These radiating elements are viewed by feed horn 250, which accepts signals from the entire array, and feed horns 251–252 which receive only from a portion of the array as indicated by elements 266–269. Elements 201–214 and 261–274 are shown arranged in straight lines but it should be clear that they could be distributed over curved lines or surfaces if desired. Also it should be recognized that while seemingly unidirectional terms such as "feed" and "illuminate" are used, the structures referred to can operate in either direction. Thus a "feed" horn can feed energy to an array that it illuminates as well as collect energy from such an array. The resulting operation of FIG. 2 is quite similar to that of FIG. 1 with the signals on line 244 derived from a large aperture array and the signals on line 245 derived from only a sub-aperture of this array. As in FIG. 1 the scanning direction of the array can be changed by varying phase shifters 221–234 under the control of scan controller 220. If desired, shifters 221–234 may be voltage controlled by a voltage appearing on line 235. Here again it is possible to dispense with the variable phase shifters by using a varying transmitted frequency to obtain the desired interelement phase shift. For example, phase shifters 221–234 could be set at fixed positions and the frequency of transmitter 290 could be varied so that as the wavelength of the transmitted and echo signals changes, the amounts of phase shift introduced by elements 221–234 vary. Duplexer 291 allows horn 250 to be used for both transmitting and receiving in a well known manner. The auxiliary horns 251–252 are used in receive only. If separate antennas are employed for transmitting and receiving, the duplexer will not be necessary.

Figure 3:
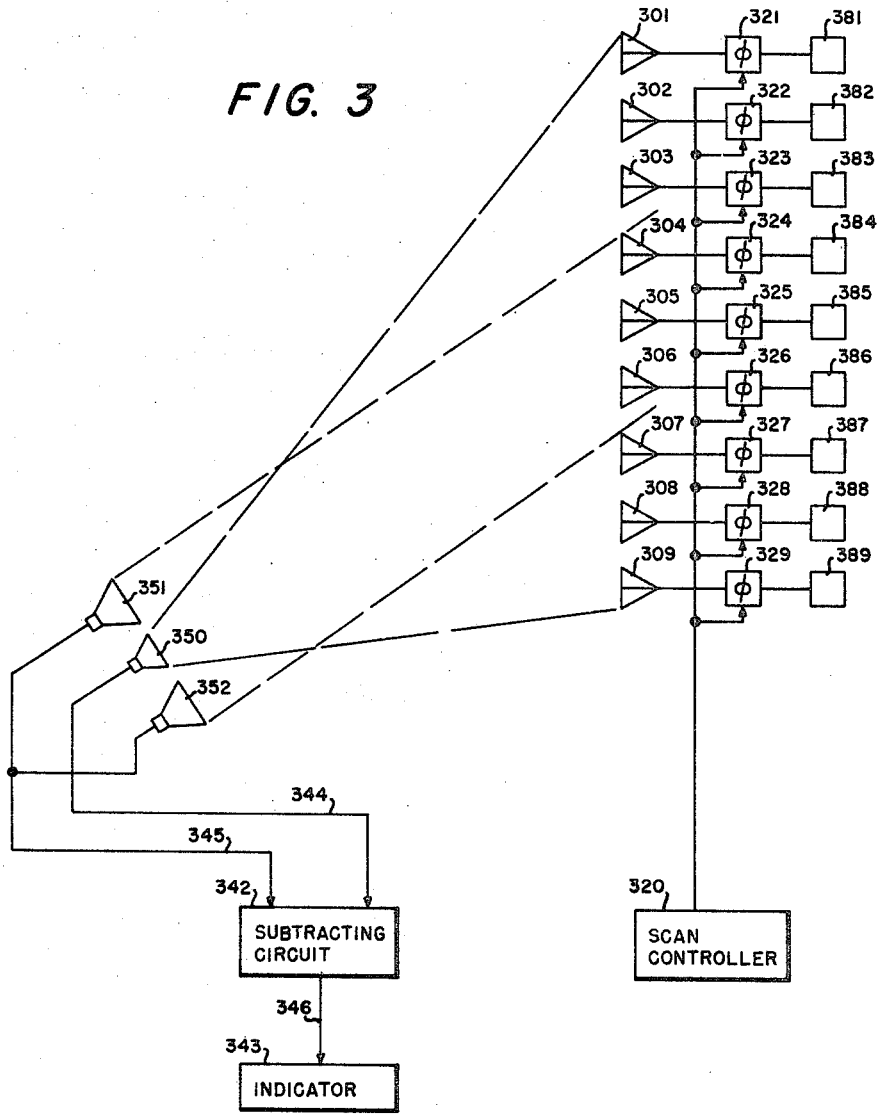
FIG. 3 shows a reflector array according to the present invention.

FIG. 3 shows an embodiment of the invention using a reflector type array. The energy from a target illuminates the array of pick-up elements 301–309, passes through phase shifting devices 321–329, is reflected by reflecting devices 381–289 (which may be short circuits terminating transmission lines), and is reradiated to be picked up by horns 350, 351 and 352. Horn 350 receives from the entire array while horns 351–352 view only elements 304–306 so that the reception pattern of horn 350 is narrow while the reception pattern of horns 351–352 is broad. As in the previously described embodiments the broad beam signal is used to eliminate sidelobe signals received by the main antenna array. Scan controller 320, substracting circuit 342 and indicator 343 all perform as their counterparts in FIGS. 1 and 2.

Figure 4:
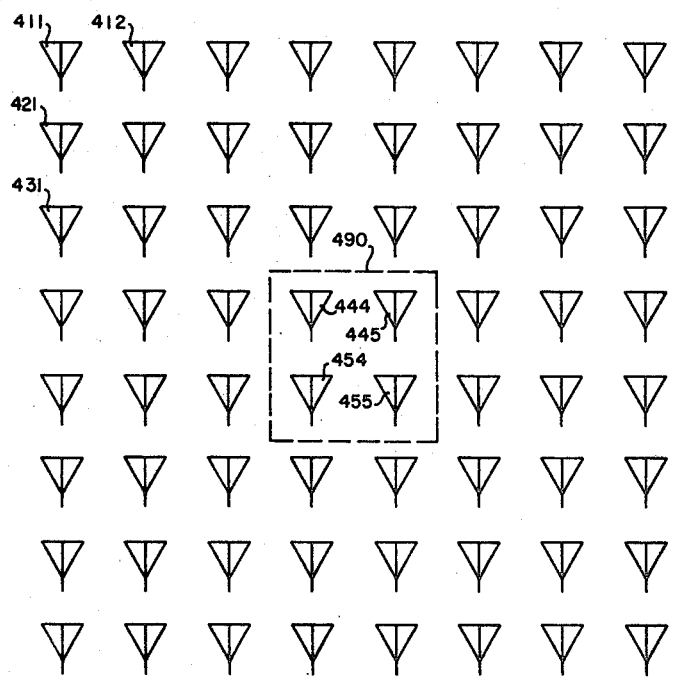
FIG. 4 shows a planar array which can be used with the present invention.

FIG. 4 shows how the invention can be used with a two-dimensional array in a manner analogous to the linear arrays of the embodiments desired above. A sub-array 490 including elements 444, 445, 454, 455 is used to obtain the required broad auxiliary beam reception to accompany the narrow main beam. The array may be planar or otherwise, depending upon the particular application. Since a portion of the array itself is used to create the auxiliary beam, this beam scans along with the main beam as is desired for sidelobe signal cancellation.

Figure 5:
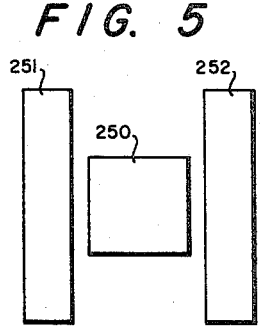
FIG. 5 shows a front view of the feed horns shown in FIG. 2.

FIG. 5 shows a front view of the horns of FIG. 2 as viewed at section 5—5. As explained above horn 250 illuminates the entire array while horns 251–252 iluminate only a portion of the array.

Figure 6:
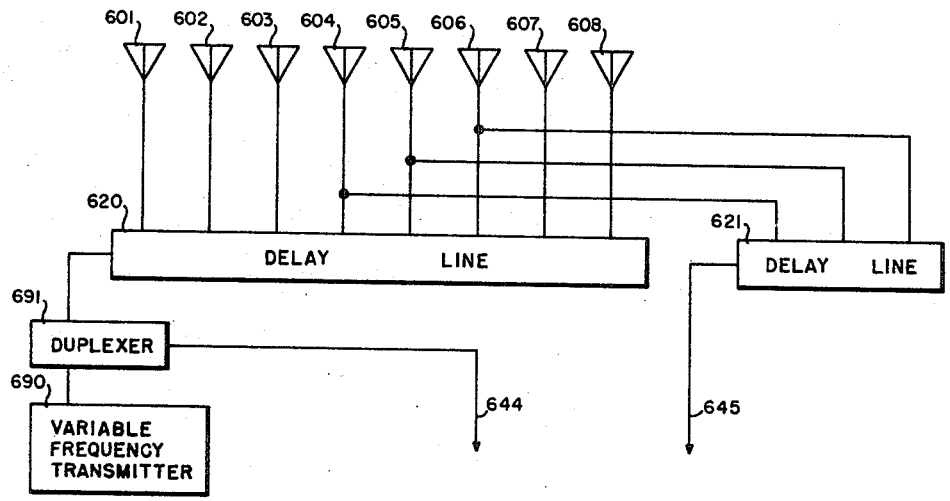
FIG. 6 shows a system according to the invention which is frequency scanned.
Figure 7:
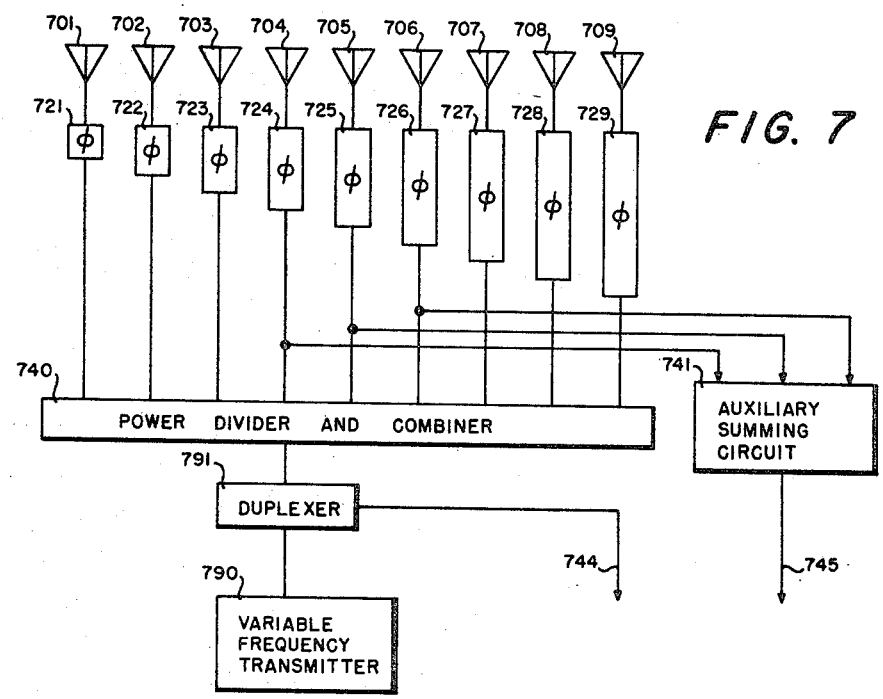
FIG. 7 shows another frequency scanned system.

FIGS. 6 and 7 show embodiments of the invention using a variable transmitted frequency to vary the direction of the reception pattern of the main beam as well as the auxiliary beam. In FIG. 6 the distances between the taps on delay lines 620 and 621 are fixed so that as the wavelength of the received signal varies, the phase relationships at the various taps also change. In FIG. 7 phase shifters 721–729 may be fixed lengths of transmission lines and, as the wavelength of the received signal varies, the phase relationships of the signals arriving at combining circuits 740 and 741 also vary. In both FIG. 6 and FIG. 7 the resulting main and auxilary signals may be processed by a signal processor not shown.

In a corporate array structure, such as that shown on page 8 of the above mentioned book by R. C. Hansen, one may not be able to readily couple to a desired portion of the array, but there will be, in most cases, space between main array elements to interleave small elements over a desired portion of the main array. The elements of this sub-array can be phase controlled in parallel with appropriate elements of the main array to give the desired broad secondary beam to follow the main beam for sidelobe cancelling. The elements of the auxiliary array could be physically separate from the aperture of the main array. In either location a portion of the existing element phasing program for main beam steering could be utilized to steer the broad beam of the auxiliary array.

In conclusion therefore, the invention provides a relatively simple solution to sidelobe cancelling in electronic arrays where a single fixed auxiliary antenna could not satisfy all regions where the main beam could be positioned. It provides a much closer phase relation between the main and auxiliary beam signals because of the close relative position and a partially common aperture. This feature is of considerable importance to radars using coherent rf sidelobe cancellation schemes. It is also valuable when the polarization of the received signal becomes an important factor.

Obviously many modifications and variations of the present invention are possible in light of the above teachings. It is therefore to be understood that within the scope of the appended claims, the invention may be practiced otherwise than specifically desired.

What is claimed and desired to be secured by Letters Patent of the United States is:

1. A sidelobe cancellation system comprising:
    an array of signal pick-up elements for simultaneously picking up wave signals;
    means to combine the wave signals from all of said elements to produce a main reception pattern signal;
    means to combine the wave signals from less than all said elements to produce an auxiliary reception pattern signal;
    means to vary the phase relationships of said wave signals after they are pick-up by the elements; and
    means to combine said main reception pattern signal and said auxiliary recepion pattern signal to cancel sidelobe signals appearing in said main reception pattern.

2. The sidelobe cancellation system of claim 1 wherein said means to vary to phase relationships of said wave signals is a plurality of variable phase shifters.

3. The sidelobe cancellation system of claim 1 wherein said means to vary the phase relationships of said wave signals includes a variable frequency transmitter.

4. The sidelobe cancellation system of claim 1 wherein said means to combine the wave signals from all of said elements is a main feed horn which receives signals from the entire array.

5. The sidelobe cancellation system of claim 4 wherein said means to combine the wave signals from less than all of said elements is an auxiliary feed horn device which receives signals from less than all of the elements in the array.

6. The sidelobe cancellation system of claim 1 wherein said pick-up elements are connected to said means to vary the phase relationships of said wave signals and to reflecter elements so that said pick-up elements reradiate said wave signals after their phase relationships are varied.

7. The sidelobe cancellation system of claim 1 wherein said array of signal pick-up elements is a linear array.

8. The sidelobe cancellation system of claim 1 wherein said array of signal pick-up elements is a multi-dimensional array.

9. The sidelobe cancellation system of claim 8 wherein said elements whose signals are combined to produce the auxiliary reception pattern signal form a multi-dimensional sub-array.

10. The sidelobe cancellation system of claim 1 wherein said means to combine said main reception pattern signal and said auxiliary reception pattern signal is a signal subtractor.

11. A sidelobe cancellation system comprising:
a planar array of wave signal pick-up elements;
means to electronically shift the relative phases of said wave signals;
means to simultaneously add the wave signals picked up by all of said elements after said signals have been phase shifted to produce a main signal;
means to simultaneously add the wave signals picked up by a planar sub-array of said pick-up elements after said signals have been phase shifted to produce an auxiliary signal; and
means to combine said main signal and said auxiliary signal to cancel sidelobe signals appearing in said main reception pattern.

12. The sidelobe cancellation system of claim 11 wherein said means to electronically shift the relative phases of said wave signals is a plurality of variable phase shifters.

13. The sidelobe cancellation system of claim 11 wherein said means to electronically shift the relative phases of said wave signals includes a variable frequency transmitter.

14. The sidelobe cancellation system of claim 11 wherein said means to add the wave signals picked up by all of said elements is a main feed horn which receives signals from the entire array.

15. The sidelobe cancellation system of claim 11 wherein said means to add the wave signals picked up by a planar sub-array of said pick-up elements is an auxiliary feed horn device which receives signals from the planar sub-array of said pick-up elements.

16. The sidelobe cancellation system of claim 11 including a plurality of reflector elements equal in number to said pick-up elements and connected to said pick-up elements so that said pick-up elements reradiate said wave signals after their phases are shifted.

17. The sidelobe cancellation system of claim 11 wherein said means to combine said main signal and said auxiliary signal is a signal subtractor.

18. A sidelobe cancellation system comprising:
an array of wave signal pick-up elements;
a plurality of variable phase shifters equal in number to said pick-up elements and connected individually to individual ones of said pick-up elements;
a scan controller connected to each of said phase shifters to vary the amount of phase shift introduced by these phase shifters;
a main feed horn which combines the signals from the entire array to form a main pattern signal;
an auxiliary feed horn device which combines signals from a sub-array of said array to form an auxiliary pattern signal; and
means to combine said main pattern signal and said auxiliary pattern signal to cancel sidelobe signals appearing in said main pattern signal.

19. The sidelobe cancellation system of claim 18 wherein said means to combine said main signal and auxiliary signal is a signal subtractor.

References Cited

UNITED STATES PATENTS

| 3,202,990 | 8/1965 | Howells | 343—100 |
| 3,248,731 | 4/1966 | Bickmore et al. | 343—100 |
| 3,270,336 | 8/1966 | Birge | 343—5 |

RODNEY D. BENNETT, *Primary Examiner.*

R. E. BERGER, *Assistant Examiner.*

U.S. Cl. X.R.

343—777, 778, 779, 853, 854